US009681268B2

(12) United States Patent
Wan et al.

(10) Patent No.: US 9,681,268 B2
(45) Date of Patent: Jun. 13, 2017

(54) MOBILE DEVICE POSITION DETECTION

(71) Applicant: Intel Corporation, Santa Clara, CA (US)

(72) Inventors: Chieh-Yih Wan, Beaverton, OR (US); Giuseppe Raffa, Portland, OR (US); Rahul C. Shah, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/851,380

(22) Filed: Sep. 11, 2015

(65) Prior Publication Data

US 2016/0007160 A1    Jan. 7, 2016

Related U.S. Application Data

(63) Continuation of application No. 13/995,363, filed as application No. PCT/US2011/068068 on Dec. 30, 2011.

(51) Int. Cl.
| | |
|---|---|
| *H04W 4/02* | (2009.01) |
| *G01S 5/00* | (2006.01) |
| *G01S 5/02* | (2010.01) |
| *H04W 24/02* | (2009.01) |
| *H04W 40/24* | (2009.01) |
| *H04W 76/02* | (2009.01) |
| *H04W 4/00* | (2009.01) |
| *H04W 64/00* | (2009.01) |
| *H04W 84/18* | (2009.01) |

(52) U.S. Cl.
CPC .......... *H04W 4/023* (2013.01); *G01S 5/0072* (2013.01); *G01S 5/0284* (2013.01); *H04W 4/027* (2013.01); *H04W 24/02* (2013.01); *H04W 40/244* (2013.01); *H04W 76/023* (2013.01); *H04W 4/008* (2013.01); *H04W 64/00* (2013.01); *H04W 84/18* (2013.01)

(58) Field of Classification Search
CPC ........ G01S 5/0252; G01S 5/02; G01S 5/0205; G01S 5/0054; G01S 5/0072; H04W 4/025; H04W 4/02; H04W 4/023; H04W 64/006; H04W 76/023; H04W 4/008
USPC ............................ 455/456.1–457, 41.1–41.3
See application file for complete search history.

(56) References Cited

U.S. PATENT DOCUMENTS

| | | | |
|---|---|---|---|
| 2004/0048571 A1* | 3/2004 | Kiyose ................... | G01C 21/16 455/41.2 |
| 2006/0276205 A1 | 12/2006 | Bengtsson | |

(Continued)

OTHER PUBLICATIONS

"Taiwan Office Action", dated Oct. 12, 2015, for Taiwan Application No. 101147481, 8pgs.

(Continued)

*Primary Examiner* — Allahyar Kasraian
(74) *Attorney, Agent, or Firm* — Buckley, Maschoff & Talwalkar LLC

(57) ABSTRACT

A method may include calculating a first distance between first and second devices and determining a direction of a movement of the first device. The method may further include calculating a second distance between the first and second devices after the movement of the first device and determining the relative position of the first device with respect to the second device based on the direction of the movement, the first distance, and the second distance.

14 Claims, 5 Drawing Sheets

(56) References Cited

U.S. PATENT DOCUMENTS

| | | | |
|---|---|---|---|
| 2007/0287386 A1* | 12/2007 | Agrawal | H04W 76/023 455/67.11 |
| 2009/0221298 A1* | 9/2009 | Hanner | G01C 21/08 455/456.1 |
| 2010/0069004 A1* | 3/2010 | Bloebaum | H04M 1/7253 455/41.3 |
| 2010/0069047 A1* | 3/2010 | Mehmet | G01V 15/00 455/414.1 |
| 2011/0083111 A1 | 4/2011 | Forutanpour et al. | |
| 2011/0239163 A1* | 9/2011 | Mochizuki | G06F 3/0482 715/853 |
| 2011/0282901 A1 | 11/2011 | Marks et al. | |
| 2012/0216153 A1* | 8/2012 | Sip | G06F 3/04883 715/863 |
| 2012/0289159 A1* | 11/2012 | Palin | H04W 48/14 455/41.2 |

OTHER PUBLICATIONS

"English Translation of Taiwan Office Action", dated Oct. 12, 2015, for Taiwan Application No. 101147481, 8pgs.

"Taiwan IPO Search Report and English-language translation", dated Oct. 6, 2015, for Taiwan Application No. 101147481, 2pgs.

\* cited by examiner

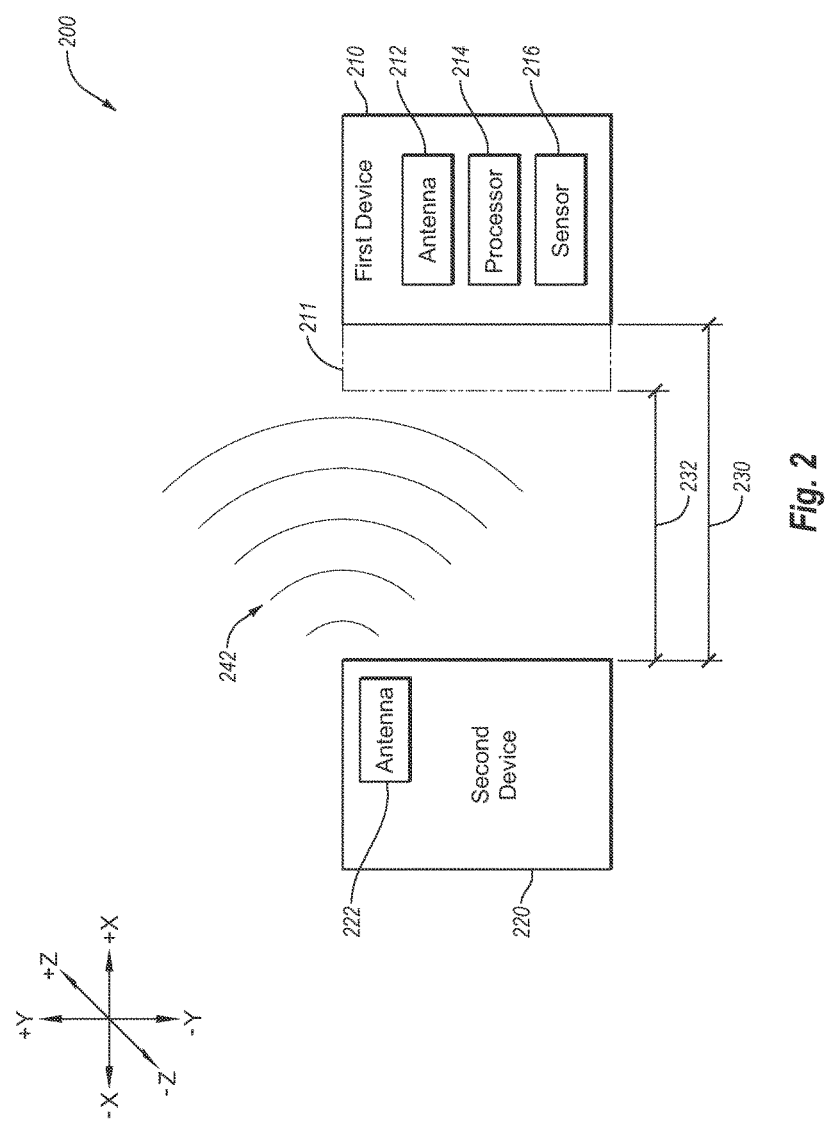

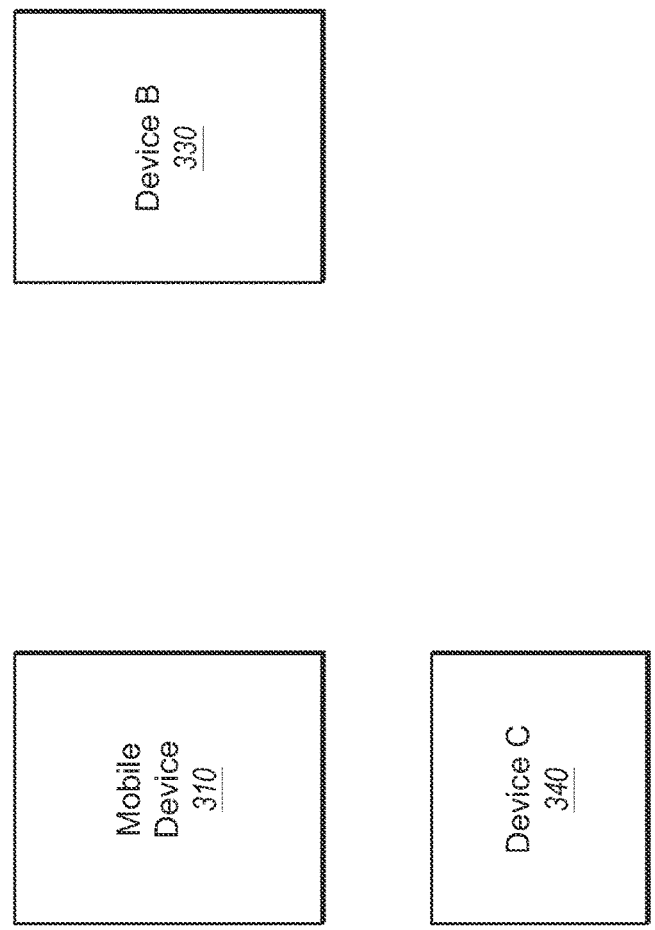
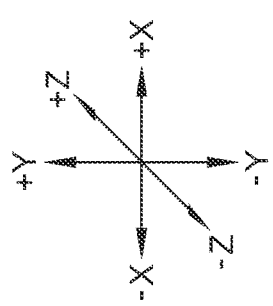
Fig. 3

MOBILE DEVICE POSITION DETECTION

BACKGROUND OF THE INVENTION

Today, more and more electronic devices are mobile devices, such as laptops, gaming consoles, smart phones, tablets, and other mobile devices. As users of mobile devices interact, they may desire to transfer data between their respective mobile devices. Currently, for users of mobile devices to share data, and in particular, where multiple users are sharing data, each mobile device will need to be identified and each user know the identification of the other mobile device. For example, if devices are sharing data over a wireless USB on-the-go connection, each user would need to know the identifying name of each device to send data to just one desired device.

Alternately, users of mobile devices may share data through a data sharing service. Data sharing services, however, typically require the data to pass through an external network. For example, if users of multiple devices desire to share a photo, they may share the data using a photo-sharing network or by texting the photo. In these instances, the users may be required know a user identification or other identification associated with the other users to distribute the photo.

BRIEF DESCRIPTION OF THE DRAWINGS

FIG. 2 is a block diagram of an example system, according to some embodiments.

FIG. 3 is a block diagram of various devices, according to some embodiments.

DETAILED DESCRIPTION OF EXAMPLE EMBODIMENTS

Figure 1A:
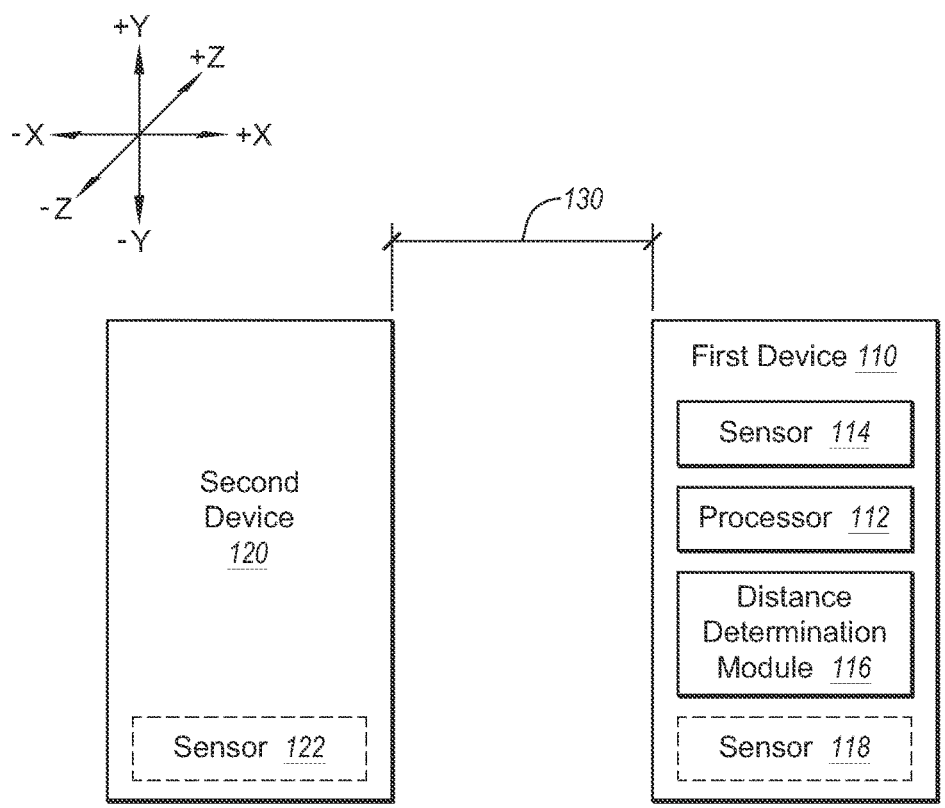
FIG. 1A is a block diagram of example first and second devices, according to some embodiments.

FIG. 1A is a block diagram of example first and second devices 110, 120, according to some embodiments. In some embodiments, the first device 110 may be a mobile device, such as, but not limited to, a tablet, smart phone, laptop, gaming console, portable media player, personal navigation device, personal digital assistant, or other mobile device. In these and other embodiments, the first device 110 may be moved by the user of the first device 110. For example, the first device 110 may be a smart phone and the user may place the first device 110 in proximity to the second device 120. Once within the proximity of the second device 120, the first device 110 may be configured to determine the relative position of the first device 110 with respect to the second device 120.

By determining the relative position of the first device 110 with respect to the second device 120, in some embodiments, a user of the first device 110 may transfer data between the first and second devices 110, 120 using intuitive gestures. For example, if the first device 110 is a tablet with a touch screen, the user of the first device 110 may share a music file with the second device 120 by pushing the music file toward the second device 120 on the screen of the first device 110. The first device 110 may recognize that the user is pushing the music file toward the second device 120 because the relative position of the second device 120 with respect to the first device 110 is known to the first device 110. The first device 110 may send the music file to the second device 120 through a previously established communication channel or through a communication channel that is then established between the first and second devices 110, 120. The above, is just one example of how the first device 110 may use the information of the relative position of the second device 120 with respect to the first device 110.

Referring again to FIG. 1A, the first device 110 includes a processor 112, sensor 114, and a distance determination module 116, all of which may be used to determine the relative position of the first device 110 with respect to the second device 120. Once the first device 110 is within the proximity of the second device 120, the distance determination module 116 may calculate a first distance 130 between the first device 110 and the second device 120.

The distance determination module 116 may be configured to calculate the first distance 130 between the first and second devices 110, 120 using multiple methods. For example, in some embodiments, the distance determination module 116 may use ultrasonic sound waves to calculate the distance 130 between the first and second modules 110, 120. In some embodiments, the distance determination module 116 may emit an ultrasonic sound wave and based on the time of a reflection from the second device 120, the first distance 130 may be calculated. Alternately or additionally, the distance determination module 116 may emit an ultrasonic sound wave and based on the time for the sound wave to be received by the second device 120, the first distance 130 may be calculated.

In some embodiments, the distance determination module 116 may use radio frequency signal strengths to calculate the first distance 130 between the first and second devices 110, 120. For example, in some embodiments, the first and second devices 110, 120 may be communicating using a Bluetooth or other direct wireless communication link, such as wireless USB or wireless USB on-the-go. In these and other embodiments, based on the signal strength of the communication link, the first distance 130 between the first and second devices 110, 120 may be calculated. In some embodiments, the first and second devices 110, 120 may be connected to a channel of a wireless network. In these and other embodiments, the first distance 130 between the first and second device 110, 120 may be calculated based on the radio frequency strengths of a signal transmitted between the first and second devices 110, 120, such as a beacon. In some embodiments, other methods or techniques may be used to calculate the first distance 130 between the first and second devices 110, 120. After calculating the first distance 130, the sensor 114 may be configured to sense a movement of the first device 110 and generate movement data. Using the movement data, the sensor 114, the processor 112, or some other module within the first device 110 may be configured to determine a direction of the movement of the first device 110. For example, in some embodiments, the sensor 114 may be an accelerometer. The accelerometer may sense the acceleration of the first device 110 and generate acceleration data. Using the acceleration data, a module with the first device 110, such as the processor 112, the sensor 114, or some other module, may determine the direction of the movement of the first device 110. In some embodiments, the sensor 114 may be more than one sensor. For example, the sensor 114 may include an accelerometer and a gyroscope. Data may be collected from both the accelerometer and the gyroscope to determine the direction of the movement of the first device 110. In some embodiments, the sensor 114 may be another type of sensor capable of generating data that may be used to determine the direction of movement of the first device 110.

Figure 1B:
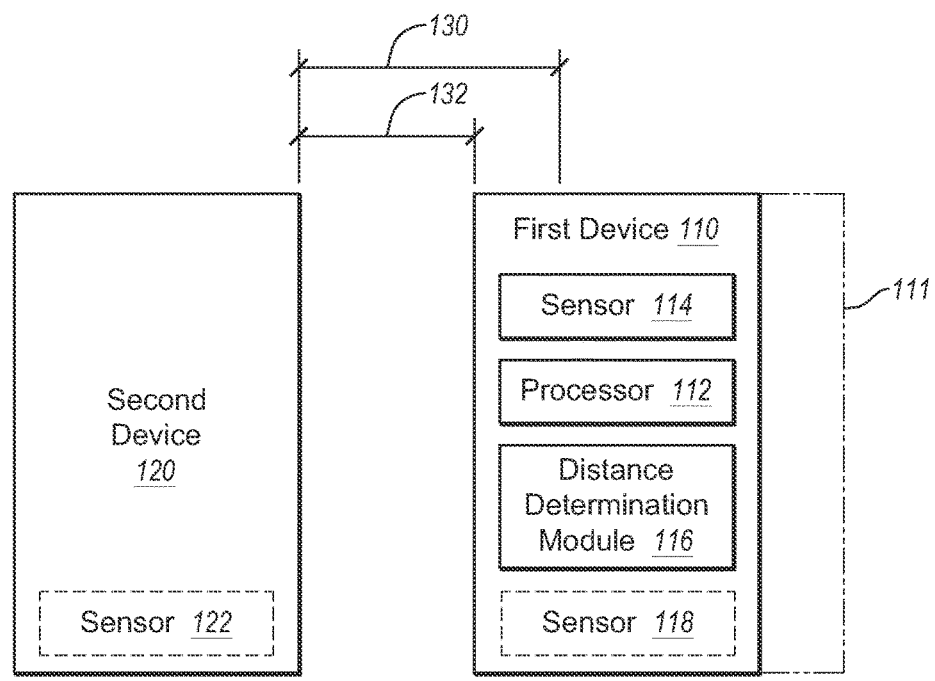
FIG. 1B is a block diagram of the example first and second devices of FIG. 1A, according to some embodiments.

FIG. 1B is a block diagram of the example first and second devices 110, 120 of FIG. 1A, according to some embodiments, and illustrates the movement of the first device 110. A dashed line 111 illustrates the location of the first device 110 in FIG. 1A, before the movement of the first device 110. The location of the first device 110 in FIG. 1B, illustrates the location of the first device 110 after the movement of the first device 110.

After the movement of the first device 110, a second distance 132 between the first device 110 and the second device 120 is calculated using the distance determination module 116. The distance determination module 116 may calculate the second distance 132 in the same manner as the first distance 130 was calculated or in a different manner.

In some embodiments, after calculating the first distance 130, the second distance 132, and the direction of the movement of the first device 110, the processor 112 may be configured to use the first distance 130, the second distance 132, and the direction of the movement of the first device 110 to determine the relative location of the first device 110 with respect to the second device 120. In particular, the processor 112 may determine the relative location of the first device 110 by analyzing the change in distance between the first and second devices 110, 120 as determined by the difference between the first distance 130 and the second distance 132 and the direction of the movement of the first device 110.

It is noted that in some embodiments, the methods or techniques used to calculate the first and second distances 130, 132 may not produce accurate distance measurements between the first and second devices 110, 120. In these and other embodiments, the first and second distances 130, 132 may be approximate distances between the first and second devices 110, 120. The method and techniques used to calculate the first and second distances 130, 132 need only be accurate enough to allow for the determination of the relative position of the first device 110 with respect to the second device 120.

For example, in some embodiments, as illustrated in FIG. 1A, the first and second devices 110, 120 may lie within the xy plane separated by the first distance 130. The first device 110 may move within the xy plane in the −x direction, that is the first device 110 may move toward the second device 120 along the x-axis. Because the distance between the first and second devices 110, 120 decreased, the processor 112 may determine that the second device 120 is located in the direction of movement of the first device 110, that is the −x direction, with respect to the first device 110. Based on this information, the processor 112 may also determine that the first device 110 is located in the +x direction with respect to the second device 120.

As another example, in some embodiments, the first and second devices 110, 120 may be positioned as illustrated in FIG. 1A. The first device 110 may move in the +x direction. In these and other embodiments, the second distance measured after the movement of the first device 110 may be larger than the first distance. Because the distance between the first and second devices 110, 120 increased, the processor 112 may determine that the second device 120 is located in the opposite direction of the movement of the first device 110, that is the −x direction, with respect to the first device 110. Based on this information, the processor 112 may also determine that the first device 110 is located in the +x direction with respect to the second device 120.

Further information may assist in determining the relative position of the first device 110 with respect to the second device 120. For example, the sensor 114 may determine the direction of the movement of the first device 110 and a distance moved by the first device 110. The distance and direction of the movement of the first device 110 along with the first and second distances 130, 132 may allow the processor 112 to determine more accurately the relative positions of the first and second devices 110, 120.

In some embodiments, the first device 110 may contain an orientation sensor 118 and the second device 120 may contain an orientation sensor 122. The orientation sensors 118, 122 may be configured to determine the orientations of the first device 110 and the second device 120 respectively. In some embodiments, the orientation sensors 118, 122 may share a similar coordinate frame of reference. For example, in some embodiments, the orientation sensors 118, 122 may be compass sensors that determine the orientation of the first and second device 110, 120 based on a coordinate system using the directions of north, south, east, and west. Using the coordinate frame of reference of the orientation sensor 118, a common coordinate frame of reference for the sensor 114 may be also determined. Using this common coordinate frame of reference, the relative direction of movement of the first device 110 may be communicated to the second device 120 and/or other device even if the second device 120 and/or other device do not share a similar orientation. Furthermore, using a common coordinate frame of reference, the relative position of the first device 110 with respect to the second device 120 may be shared with the second device 120 and/or other devices to enable the second device 120 and/or other devices to determine their relative position with respect to the first device 110 even if first and second device 110, 120 and/or other devices do not share a similar orientation.

Additionally, the granularity and accuracy of the information used by the processor 112, such as the first and second distances 130, 132 and the direction and distance of the movement of the first device 110, may determine the accuracy of the determined relative positions of the first and second devices 110, 120. For example, in some embodiments, the relative positions of the first and second devices 110, 120 may be determined to be one of four general directions, such as +x, −x, +y, −y. In other embodiments, the relative positions of the first and second devices 110, 120 may be determined to be one of eight general directions, such as +x, −x, +y, −y, +x+y, −x+y, +x-y, +x-y. In other embodiments, the relative positions of the first and second devices 110, 120 may be determined to be one of six general directions, such as +x, −x, +y, −y, −z, +z. It is noted that numerous of combinations and number of general directions for the relative positions of the first and second devices 110, 120 may be possible based on the granularity and accuracy of the information used by the processor 112.

In some embodiments, the processor 112, sensor 114, and/or the distance determination module 116 may be combined in a single module or may be individual modules within the first device 110. In some embodiments, the processor 112, sensor 114, and the distance determination module 116 may be used by the first device 110 to perform operations other than determining the relative positions of the first and second devices 110, 120. In some embodiments, the distance determination module 116 and the processor 112 may be implemented in hardware, firmware, and/or software.

In some embodiments, the second device 120 may be a mobile device or a stationary device, such as a desktop computer, smart television, or other stationary electronic device. In some embodiments, a communication link between the first and second devices 110, 120 may be established before, during, or after the relative positions of the first and second devices 110, 120 are determined. The communication link may be a wireless communication link or a wired communication link. In some embodiments, the first device 110 may send the determined relative position of the second device 120 with respect to the first device 120 to the second device 120.

In some embodiments, the first device 120 may include more than one sensor 114. For example, in some embodiments, the first device 120 may include two or more sensors that may be used in combination or individually to determine a direction of movement of the first device 120.

FIG. 2 is a block diagram of an example system 200, according to some embodiments. The system 200 includes a first device 210 and a second device 220. The first device 210 includes an antenna 212, processor 214, and a sensor 216. The second device 220 includes an antenna 222.

In some embodiments, the first and second devices 210, 220 may be communicating over a channel within a wireless network. As part of communicating over the wireless network, the first and second devices 210, 220 may be transmitting wireless network signals. For example, if the wireless network was an 802.11 wireless network, the wireless network signal may be a beacon signal. The wireless network signal may contain data therein. For example, in some embodiments, the wireless network signal may include the signal strength of the wireless network signal when transmitted. In some embodiments, the wireless network signal may also include the media access control (MAC) address of the device transmitting the wireless signal.

Being part of the same channel within a wireless network, the first device 210 may receive a wireless network signal 242 from the second device 220 that may not be directly intended for the first device 210 or a direct communication with the first device 210. Likewise, in some embodiments, the second device 220 may receive a wireless network signal (not shown) from the first device 210 that may not be directly intended for the second device 220 or a direct communication with the second device 220.

Using the information within the wireless network signal 242, first device 210 may determine the transmission signal strength of the wireless network signal 242. The transmission signal strength may be the strength of the wireless network signal 242 when the wireless network signal 242 is first broadcast by the antenna 222 of the second device 220. The first device 210 may also determine the received signal strength of the wireless network signal 242 when the wireless network signal is received by antenna 212 of the first device 210. The received signal strength may be the strength of the wireless network signal 242 at the antenna 212 when received by the first device 210.

Using the strength of the wireless network signal 242 at transmission and reception, the processor 214 in the first device 210 may calculate a first distance 230 between the first and second devices 210, 220. In these and other embodiments, the first and second devices 210, 220 may be close enough to each other so that the antenna 212 is in a location where a line of sight signal of the wireless network signal 242 is the dominant signal. In some embodiments, where the antenna 212 is in a location where the reflective signal of the wireless network signal 242 is the dominant signal, other means may be used to calculate a distance between the first and second devices 210, 220.

After determining the first distance 230 between the first and second devices 210, 220, the first device 210 may determine a direction of a movement of the first device 210 using the sensor 216. In some embodiments, the sensor 216 may be an accelerometer that produces acceleration data representing the acceleration of the first device 210. The processor 214 or some other module within the first device 210 may determine the direction of the movement of the first device 210 based on the acceleration data. As illustrated in FIG. 2, the first device 210 may move from an original position, to a position indicated by the dotted line 211.

The processor 214 may then use the transmission and reception strength of a wireless network signal 242 transmitted and received after the first device is in the position indicated by the dotted line 211 to calculate a second distance 232 between the first and second devices 210, 220. With the calculated first and second distances 230, 232 and the direction of the movement of the first device 210, the processor 214 may determine the relative position of the first device 210 with respect to the second device 220 in a similar fashion as described above with respect to FIG. 1. Thus, in some embodiments, the relative position of the first device 210 with respect to the second device 220 may be determined when each of the first and second devices 210, 220 contain a single antenna, 212, 222.

In some embodiments, the first and/or second distances 230, 232 used to determine the relative position between the first and second device 210, 220 may be based on one or more calculated distances between the first and second devices 210, 220. For example, before the movement of the first device 210, the first device 210 may calculate a first distance 230 between the first and second devices 210, 220 multiple times using multiple wireless network signals. For example, the first device may receive five wireless network signals 242 from the second device 220 and may calculate the first distance 230 five times before the movement of the first device 210. In some embodiments, the first distance 230 used by the processor 214 to determine the relative position of the first device 210 with respect to the second device 220 may be the mean, medium, weighted mean, or some other combination or subset combination of the five calculated first distances 230. For example, the first distances 230 used by the processor 214 to determine the relative position of the first and second devices 210, 220 may be the mean of the first distances 210 that are within one standard deviation of the mean of the five calculated first distances 210. In other embodiments, the first distance 230 used by the processor 214 may be the shortest or longest of the five calculated first distances 210.

In some embodiments, after determining the relative position of the second device 220, the first device 210 may established a communication link between the first and second device 210, 220. In some embodiments, the first device 210 may establish the communication link using the MAC addressed obtained from the beacon transmitted by the second device 220. Establishing the communication link may allow the first and second devices 210, 220 to share data. The communication link may also allow the first device 210 to share the relative position of the first device 210 with respect to the second device 220 with the second device 220. For example, in some embodiments, the first and second devices 210, 220 may share data as directed by intuitive gestures by users of the first and second devices 210, 220.

In some embodiments, the first device 210 may send the first and second distances 230, 232 and the direction of movement of the first device 210 to another device for processing and determining the relative position of the first and second device 210, 220. Alternately or additionally, another device besides the first device 210 may calculate the first or second distances 230, 232 or the direction of movement of the first device 210. The other device may receive information from the first device 210 necessary to determine the first and second distances 230, 232 and the direction of movement of the first device 210. In some embodiments, the processor 216 may be implemented in hardware, firmware, and/or software.

FIG. 3 is a block diagram of various devices, including a mobile device 310, device A 320, device B 330, and a device C 340, according to some embodiments. The mobile device 310 may be a device similar to the first device 110, 210 of FIGS. 1A, 1B, and 2, wherein the mobile device 310 may be configured to determine the relative positions of the device A 320, device B 330, and the device C 340 with respect to the mobile device 310.

In some embodiments, the mobile device 310 and the devices 320, 330, 340 may be operating on the same channel within a wireless network. The mobile device 310 may determine the relative positions of the devices 320, 330, 340 using a wireless network signal received from the devices 320, 330, 340 similar to how the mobile device 210 determined the relative position of the second device 220 with respect to FIG. 2. For example, the mobile device 310 may determine that the device A 320 is in the +y direction, that the device B 330 is in the +x direction, and that the device C 340 is in the −y direction. The mobile device 310 may associate the MAC addresses of the devices 320, 330, 340 with their relative positions and establish a communication link with the device 320, 330, 340. A user of the mobile device 310 may transfer data to device A by pushing the data in the +y direction along a screen of the mobile device 310. Likewise, the user of the mobile device 310 may transmit data to device B 330 by pushing data in the +x direction along the screen and may transmit data to the device C 340 by pushing data in the −y direction along the screen.

In some embodiments, one or more of the devices 320, 330, 340 may be mobile devices. In these and other embodiments, the mobile device 310 may not establish a communication link with the devices 320, 330, 340 until prompted by a user of the mobile device 310. The mobile device 310 may be prompted to establish a communication link to transfer data with the device A 320, for example, by the user moving the mobile device 310 in the +y direction toward the device A 320. A connection may be established if a user of device A 320 also moves the device A 320 in a −y direction toward the mobile device 310. In some embodiments, a communication link to transfer data may be established if the movements of the mobile device 310 and the device A 320 occur with a predetermined period, such as 1 second, 1.5 seconds, 3 seconds, or some other period.

Figure 4:
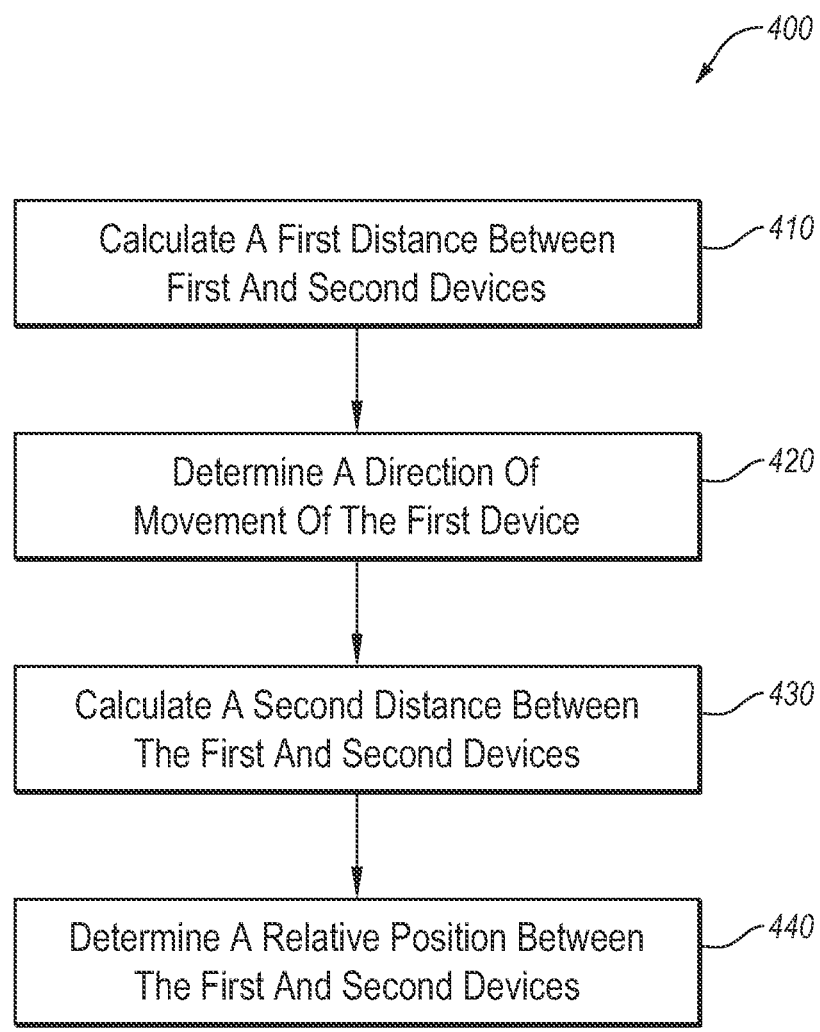
FIG. 4 illustrates a flow chart of an example method, according to some embodiments.

FIG. 4 is a flow chart of an example method 400 according to some embodiments. The method 400 may be performed, for example, by the first 110 and second devices 120 described with respect with FIGS. 1A and 1B. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine result in performance according to any of the embodiments described herein.

At 410, a first distance between first and second devices is calculated. The first distance may be calculated by either the first device, the second device, or some other device. The first distance may be calculated using one or more methods. For example, in some embodiments, ultrasonic sound waves emitted by either the first or the second device may be used to calculate the distance. Alternately or additionally, a signal emitted from one of the first and second devices and received by the other of the first and second devices may be used to determine the distance between the first and second devices. For example, in some embodiments, the second device may emit a wireless network signal used within a wireless communication network. For example, in some embodiments, the wireless network signal may be a beacon signal that contains the transmission strength of the beacon signal. Based on the strength of the signal when received by the first device and the strength of the signal with transmitted by the second device, the distance between the first and second devices may be calculated.

At 420, a direction of a movement of the first device is determined. In some embodiments, determining the direction of the movement may include sensing the direction of the movement using at least one sensor within the first device. In some embodiments, the sensor may be an accelerometer. In these and other embodiments, sensing the direction of movement of the first device may include sensing acceleration or other movement and generating movement data representing the movement of the first device. The direction of movement may then be derived from the movement data generated by the sensor. In some embodiments, the sensor may derive the direction from the movement data. Alternately or additionally, a processor or other module within the first device or some other device, such as the second device that receives the movement data, may derive the direction from the movement data.

At 430, a second distance between the first and second devices may be calculated after the movement of the first device. The second distance may be calculated by either the first device, the second device, or some other device. The second distance may be calculated using one or more methods as described above in 410. In some embodiments, the same method used to calculate the first distance may be used to calculate the second distance. In some embodiments, a different method may be used to calculate the first and second distances.

At 440, the relative position of the first device with respect to the second device is determined based on the direction of the movement and the calculated first and second distances. The relative position may be determined by the first device, second device, or some other device. In some embodiments, the relative position may be determined by analyzing a difference in the distance between the first and second devices after the movement of the first device and the direction of the movement of the first device.

In some embodiments, the accuracy of the determined relative position may depend on the granularity and accuracy of the information used to determine the relative position, namely the direction of the movement and the calculated first and second distances. For example, if the direction of the movement may only be determined in four general directions within a plane, then the relative position may be determined based on the four general directions within the plane.

In some embodiments, the method 400 may be performed by the first device, the second device, some other device, or some combination thereof. In some embodiments, the first and/or second device may be mobile devices, such as, tablets, smart phones, laptops, gaming consoles, portable media players, personal navigation devices, personal digital assistants, or other mobile devices. In some embodiments, each of the first and second devices may include a single wireless antenna.

In some embodiments, the method 400 may further include additional actions. For example, in some embodiments, if the first device determined the relative position of the first and second devices, the method 400 may include sending the relative position of the first and second devices to the second device. Alternately or additionally, the method 400 may include passing information between the first and second devices based on user input related to the relative position of the first and second devices.

Figure 5:
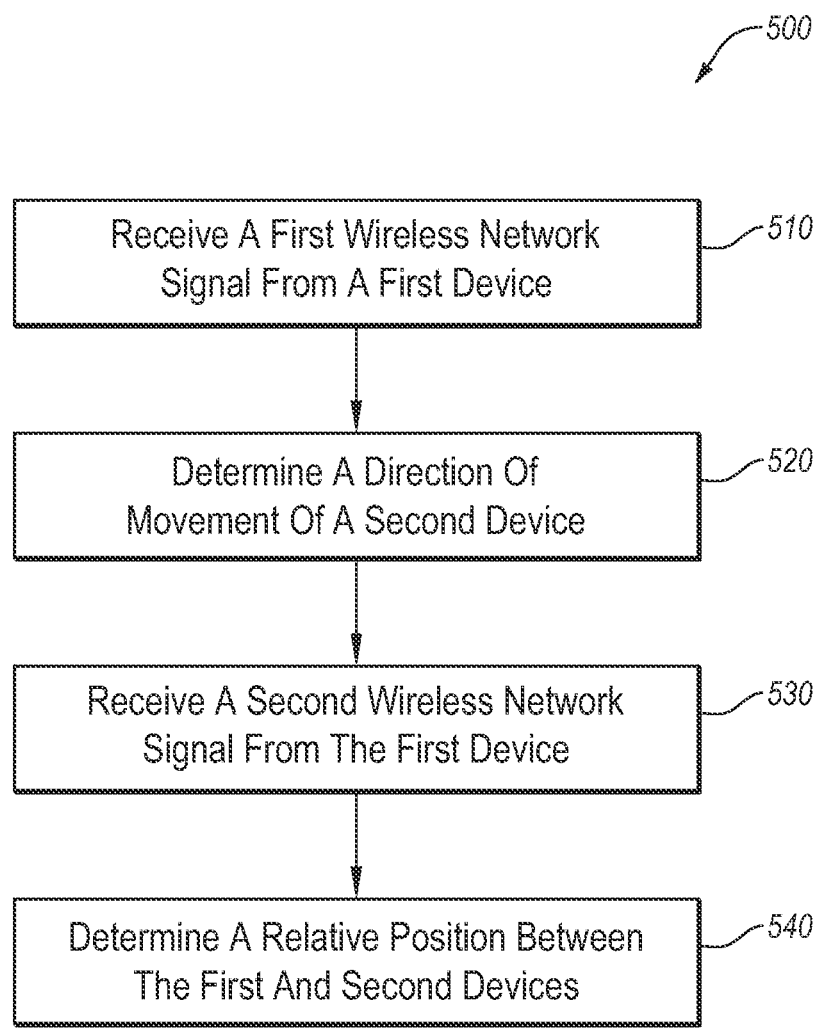
FIG. 5 illustrates a flow chart of another example method, according to some embodiments.

FIG. 5 is a flow chart of an example method 500 according to some embodiments. The method 500 may be performed, for example, by the system 200 described with respect with FIG. 2. At 510, a second device may receive a first wireless network signal from a first device. In some embodiments, the first device may send a wireless network signal, such as a beacon signal, on a channel within a wireless communication network. The wireless network signal may include data therein, including the signal strength of the wireless network signal when transmitted by the first device. The second device may be connected to the channel within the wireless communication network and may receive the wireless network signal and obtain the data within the wireless network signal. The second device may also calculate the signal strength of the first wireless network signal when received at the second device.

At 520, a direction of a movement of the second device may be determined using at least one sensor within the second device. For example, in some embodiments, the sensor within the second device may be an accelerometer. The second device may receive acceleration data from the accelerometer and determine therefrom the direction of the movement of the second device.

At 530, the second device may receive a second wireless network signal from the first device after the movement of the second device. The second device may obtain the data within the second wireless network signal. The second device may also calculate the signal strength of the second wireless network signal when received at the second device.

At 540, the relative position of the first device with respect to the second device may be determined based on the direction of the movement of the second device, the first wireless network signal, and the second wireless network signal In some embodiments, a first distance between the first and second devices may be calculated using data within the first wireless network signal and a second distance between the first and second device may be calculated using data within the second wireless network signal. For example, in some embodiments, the first distance may be calculated using the difference between the transmission signal strength of the first wireless signal at the first device and the reception signal strength of the first wireless signal at the second device. Similarly, in some embodiments, the second distance may be calculated using the difference between the transmission signal strength of the second wireless signal at the first device and the reception signal strength of the second wireless signal at the second device.

Based on the calculated first and second distances and the direction of the movement of the second device, the relative position of the first device with respect to the second device may be determined. In some embodiments, the relative position may be determined by analyzing a difference in the distance between the first and second devices after the movement of the first device and the direction of the movement of the first device.

In some embodiments, the calculations performed in the method 500 may be performed by the first device, the second device, some other device, or some combination thereof. In some embodiments, the first and/or second device may be mobile devices, such as, tablets, smart phones, laptops, gaming consoles, portable media players, personal navigation devices, personal digital assistants, or other mobile devices. In some embodiments, each of the first and second devices may include a single wireless antenna.

Although particular system, hardware, and interface configurations have been described herein, embodiments may be performed with any other types of system, hardware, and/or interface configurations. Similarly, although specific methods have been described, any number of other types of methods might be performed in connection with embodiments described here.

The several embodiments described herein are solely for the purpose of illustration. Persons skilled in the art will recognize from this description that other embodiments may be practiced with modifications and alterations limited only by the claims.

What is claimed is:

1. A non-transitory computer-readable storage medium having stored thereon instructions that when executed by a machine result in the following:
   calculating a first distance between first and second devices, based on receiving, at the first device, a plurality of wirelessly transmitted signals from the second device wherein the first device is a mobile device and the second device is a mobile device;
   determining a direction of a movement of the first device;
   calculating a second distance between the first and second devices after the movement of the first device;
   determining a relative position of the first device with respect to the second device based on the direction of the movement, the first distance, and the second distance;
   receiving a user gesture, the user gesture indicating (1) a transfer of data from the first device to the second device and (2) a direction toward the second device;
   prompting the first device to establish a communication link to transfer data with the second device by the user moving the first device in a first direction toward to the second device and moving the second device in a second direction toward to the first device within a predetermined time period to establish a connection between the first device and the second device; and
   transmitting the data from the first device to the second device based on the user gesture indicating the position toward the second device.

2. The non-transitory computer-readable storage medium of claim 1, wherein the first distance is based on a plurality of calculated distances between the first and second devices and wherein the first distance is a mean of the plurality of calculated distances that are within one standard deviation of the mean of the plurality of calculated distances.

3. The non-transitory computer-readable storage medium of claim 1, wherein the first distance is based on a plurality of calculated distances between the first and second devices and wherein the first distance is a longest of the plurality of calculated distances.

4. The non-transitory computer-readable storage medium of claim 3, wherein the first distance is based on a plurality of calculated distances between the first and second devices and wherein the first distance is a shortest of the plurality of calculated distances.

5. The non-transitory computer-readable storage medium of claim 1, wherein execution of the instructions further results in:
establishing a communications link to transfer data between the first device and the second device based on a predetermined time period.

6. The non-transitory computer-readable storage medium of claim 1, wherein execution of the instructions further results in sending the relative position of the first device with respect to the second device to the second device.

7. The non-transitory computer-readable storage medium of claim 1, wherein at least one of the plurality of wirelessly transmitted signals is a beacon signal.

8. The non-transitory computer-readable storage medium of claim 1, wherein the first direction is a +y direction and the second direction is −y direction.

9. A non-transitory computer-readable storage medium having stored thereon instructions that when executed by a machine result in the following:
receiving, at a second device, a first wireless network signal from a first device; wherein the first device is a mobile device and the second device is a mobile device;
determining a direction of a movement of the second device using at least one sensor within the second device;
receiving, at the second device and after the movement of the second device, a second wireless network signal from the first device;
determining a relative position of the first device with respect to the second device based on the least one wirelessly transmitted signal that was not intended for the second device, the direction of the movement of the second device, the first wireless network signal, and the second wireless network signal;
receiving a user gesture, the user gesture indicating (1) a transfer of data from the second device to the first device and (2) a direction toward the first device;
prompting the first device to establish a communication link to transfer data with the second device by the user moving the first device in a first direction toward to the second device and moving the second device in a second direction toward to the first device within a predetermined time period to establish a connection between the first device and the second device; and
transmitting the data from the second device to the first device based on the user gesture indicating the position toward the first device.

10. The medium of claim 9, wherein the first and second wireless network signals are beacon signals.

11. The medium of claim 9, wherein execution of the instructions further results in calculating a first distance between the first and second devices using data within the first wireless network signal and calculating a second distance between the first and second devices using data within the second wireless network signal.

12. The medium of claim 11, wherein determining the relative position of the first device with respect to the second device is based on the direction of the movement of the second device and a difference between the first and second distances.

13. The medium of claim 9, wherein the at least one sensor is an accelerometer.

14. The medium of claim 9 wherein the first direction is a +y direction and the second direction is −y direction.

\* \* \* \* \*